Patented Aug. 15, 1939

2,169,227

UNITED STATES PATENT OFFICE 2,169,227

MANUFACTURE OF ESTERS

Harold S. Davis and Alfred W. Francis, Woodbury, N. J., assignors to Socony-Vacuum Oil Company, Incorporated, a corporation of New York No Drawing. Application March 9, 1934, Serial No. 714,823

7 Claims. (Cl. 260—497)

This invention is broadly directed to processes for the direct esterification of olefins with fatty acids, and is specifically directed to improvements in prior processes wherein this esterification is conducted with fatty acid in intimate contact with sulfuric acid.

The direct esterification of olefins has been disclosed by such references as Ellis and Cohen, U. S. Patent No. 1,365,052 who contact liquid condensates containing olefins with a fatty acid such as for instance, acetic acid in the presence of 10% or more of sulfuric acid, and by Frolich and Young, U. S. Patent No. 1,877,291, who practise an improvement upon the above operation. In general terms, these processes contemplate a contacting, preferably continuous and in countercurrent, of a substantially anhydrous fatty acid such as glacial acetic acid containing 10 to 30 per cent of sulfuric acid, and a condensate containing for instance, a mixture of propane and propylene, or butane and butylene, etc. In these processes, the concentration of sulfuric acid must be fairly high to maintain a desirable economic reaction rate. In the presence of such concentration of sulfuric acid, especially when that acid is recycled continuously, as in the operation described by Frolich a high concentration of sulfuric acid tends to form polymers of the olefins and other hydrocarbons present in the system. These polymers are transferred to the ester product, can only be separated from it with difficulty, and are inclined to be odorous and otherwise undesirable. The acetate of the ethyl radical is not usually made by this process, as the handling of ethylene under these conditions presents some difficulties, and it is more common to make ethyl acetate by esterification of ethyl alcohol with acetic acid, under the influence of sulfuric acid. It is, however, comparatively easy to make various ethyl sulfate combinations, such as diethyl sulfate and ethyl sulfuric acid, by combination of ethylene and sulfuric acid directly, and it has been found that these compounds when used in the direct esterification operation instead of free sulfuric acid, provide a new means for controlling the rate of reaction and of avoiding polymerization and result in a mixture of ethyl acetate and isopropyl acetate or other esters as a reaction product.

Ethyl and isopropyl acetates boil at 77.1° C. and 89° C. respectively, this difference being so slight that they can be separated only by very close, carefully controlled, fractional distillation. In the principal industrial use for esters, namely as solvents, the two are not greatly different in properties, and the mixture can be considered practically equivalent to either one alone.

For these reasons, the objects of the present invention have been to devise a process whereby a mixture of ethyl and isopropyl acetates for example, can be readily produced with a minimum of process steps, from olefin materials commonly present in by-products of petroleum refining. Among the objects of this invention are also the provision of a process whereby these and similar products can be recovered in a maximum degree of purity, and whereby comparatively cheap hydrocarbon sources can be made to replace normal vegetable sources of the ethyl radical, and whereby the useful isopropyl radical can be prepared in a form wherein it may be associated with the ethyl radical for such uses for which the two are practically identical, and whereby certain other objects and advantages are attained as will hereinafter appear.

As an example, this invention may be illustrated by the manufacture of mixed ethyl and isopropyl acetates from acetic acid, propylene and sulfated ethylene. These reagents are intimately contacted with heating, the acetic acid, it is believed, then replacing some of the combined sulfuric acid which then catalyzes, or brings about or aids in bringing about in some way, the direct acetylation of propylene. The mixed esters formed are then recovered from the reaction product by any suitable means, the preferred one being distillation in a current of propylene.

In the above brief description, the term "sulfated ethylene" includes diethyl sulfate, ethyl sulfuric acid, or any mixture of the two, and may also include relatively small amounts of free sulfuric acid. This product is an intermediate in the present method of manufacture of synthetic alcohol from ethylene and sulfuric acid, but the method of its formation is not part of this invention.

The chemistry of the present process may be explained in part by the following chemical equations, but this invention is not limited to this explanation:

(1) 

(2) 

(3) 

Equation 1 represents the conversion of diethyl sulfate by acetic acid to ethyl acetate and free sulfuric acid. The second represents the corresponding transformation of ethyl sulfuric acid, while the third represents in shortened form, the direct esterification of propylene.

The three reagents of this process are all completely miscible and so require no agitation, but it may be convenient to pass the propylene in a tower (or other countercurrent contact device), countercurrent to the mixture of acetic acid and sulfated ethylene. The relative amounts of propylene and sulfated ethylene may conveniently depend upon the relative amounts of propylene and ethylene available for the process, and may vary over wide ratios. A suitable ratio is that corresponding to equal volumes of ethylene and propylene. The acetic acid used should be approximately that indicated as required according to the above equations. The temperature may vary over a wide range, say from 50–150° C., the preferred temperature being 100–120° C. The pressure varies with the temperature, being merely that pressure necessary to hold the desired proportion of propylene in the system as a liquid or at a density approaching that of a liquid. At the preferred temperatures of 100–120° C. the preferred pressure is within the range of about 500 to 700 pounds per square inch. The reaction time varies with the temperature and concentration of total sulfuric acid (free and combined with ethylene). A reaction time of about 25 minutes may ordinarily be expected with the preferred temperature range of 100–120° C. All of the above defined limits of temperature are largely dictated by economic considerations, being those temperatures which range between a temperature where the reaction desired is too slow on the one hand, and a temperature where the reversibility of the reaction or dissociation of the products is too great upon the other hand. The preferred limits indicated are those which have been found to best balance the requirements of proper length of reaction time and freedom from dissociation of products, against the cost of larger equipment, etc., made compulsory by longer reaction times at lower temperatures and concentrations.

As an example of the formation of these mixed acetates, there are here given the conditions of one experiment wherein 100 parts by weight of diethyl sulfate, 230.5 parts of glacial acetic acid, technical grade, and 95.7 parts of liquid propylene, were mixed together and held at a temperature of 85° C. for a period of six hours, under sufficient pressure to keep the propylene in the system as a liquid at that temperature. This operation yielded 80.2 parts of ethyl acetate and 212 parts of isopropyl acetate, the remainder of the reaction mixture being propylene, acetic acid, and sulfuric acid. These yields show that the acetylation of the propylene was about 91% complete. As previously indicated, the source of the sulfated ethylene may be from a combination of ethylene and sulfuric acid, and the acetic acid, while necessarily substantially anhydrous to avoid hydrolysis of product, may be the technical grade of glacial acid, as higher purity than this is not always required. The propylene raw material is preferably in the form of a pure liquid.

When the reaction mixture containing mixed acetates is formed, these acetates may be recovered from that mixture by any suitable means. In general, the means used in the prior art for such recovery are dilution, followed by recovery of the acetate from the water layer, or by extraction of the acetate from the reaction mixture by hydrocarbon solvents. Ordinary distillation cannot be practised because of the dissociation of the acetates at higher temperatures, and both of the above methods have serious drawbacks in the lack of ability to properly concentrate product and recover reagents. It is preferred to recover the mixed acetates by a process of distillation in which gaseous propylene is bubbled through the reaction mixture, the acetates carried away thereby, and then recovered by condensation from the vapor stream. In our co-pending application S. N. 714,821, we have described and claimed a process for the recovery of alkyl esters from the reaction product resulting from the process described therein, by distillation in a current of olefine gas, which we have found to be suitable also for the recovery of the alkyl esters from the reaction product resulting from the process of the present invention.

It is understood that the specific exemplary data and theory herein set forth is solely for the purpose of illustration and explanation, and that the invention is not to be limited thereby to the conditions and theories disclosed, being subject only to such limitations as may appear in the following claims.

We claim:

1. In the method of preparing the alkyl fatty acid esters corresponding to a olefine and to an alkyl sulphate of a less easily esterified olefine by the chemical interaction of the fatty acid with the first-mentioned olefine and with the alkyl sulphate, the step which comprises, essentially, bringing the first-mentioned olefine into intimate contact with a substantially non-aqueous liquid comprising essentially the fatty acid and the alkyl sulphate, said liquid being substantially free from uncombined sulphuric acid, whereby the said chemical interaction takes place without the formation of objectionable amounts of impurities such as polymerized olefine, the temperature and pressure of the reaction mixture being sufficiently elevated to produce a substantial speed or rate of chemical interaction between the first-mentioned olefine and the fatty acid but the temperature being below that at which substantial dissociation of the reaction products occurs.

2. In the method of preparing isopropylacetate by the chemical interaction of propylene and acetic acid, the step which comprises, essentially, bringing the propylene into intimate contact with a substantially non-aqueous liquid comprising essentially acetic acid and sulfated ethylene, said liquid being substantially free from uncombined sulphuric acid, whereby the said interaction between propylene and acetic acid takes place without the formation of objectionable amounts of impurities such as polymerized propylene, the temperature and pressure of the reaction mixture being sufficiently elevated to produce a substantial speed or rate of chemical interaction between the propylene and the acetic acid but the temperature being less than that at which substantial dissociation of the reaction products occurs.

3. In the method of preparing the alkyl fatty acid esters corresponding to a gaseous olefine and to an alkyl sulphate of a less easily esterified olefine by the chemical interaction of the fatty acid with the first-mentioned olefine and with the said alkyl sulphate, the step which comprises, essentially, bringing the first-mentioned olefine into intimate contact with a substantially non-aqueous liquid comprising essentially the fatty acid and the said alkyl sulphate, maintaining sufficient pressure on the mixture during said interaction to keep the gaseous olefine at a density substantially equal to its density in its liquid state, said non-aqueous liquid being substantially free from uncombined sulphuric acid, whereby the said interaction takes place without the formation of objectionable amounts of impurities such as polymerized olefine, the temperature of the reaction mixture being sufficiently elevated to produce a substantial speed or rate of chemical interaction between the first-mentioned olefine and the fatty acid, but below that at which substantial dissociation of the reaction products occurs.

4. In the method of preparing isopropylacetate by the chemical interaction of propylene and acetic acid, the step which comprises, essentially, bringing the propylene into intimate contact with a substantially non-aqueous liquid comprising essentially acetic acid and sulfated ethylene, maintaining sufficient pressure on the mixture during said interaction to keep the propylene at a density substantially equal to its density in a liquid state, said non-aqueous liquid being substantially free from uncombined sulphuric acid, whereby the said interaction takes place without the formation of objectionable amounts of impurities such as polymerized propylene, the temperature of the reaction mixture being sufficiently elevated to produce a substantial speed or rate of chemical interaction between the propylene and the acetic acid but the temperature being less than that at which substantial dissociation of the reaction products occurs.

5. In the method of preparing the alkyl fatty acid esters corresponding to an olefine and to an alkyl sulphate of a less easily esterified olefine by the chemical interaction of the fatty acid with the first-mentioned olefine and with the alkyl sulphate, the steps which comprise, essentially, bringing the first-mentioned olefine into intimate contact with a substantially non-aqueous liquid comprising essentially the fatty acid and the alkyl sulphate, said liquid being substantially free from uncombined sulphuric acid, whereby the said chemical interaction takes place without the formation of objectionable amounts of impurities such as polymerized olefine, the temperature and pressure of the reaction mixture being sufficiently elevated to produce a substantial speed or rate of chemical interaction between the first-mentioned olefine and the fatty acid but the temperature being below that at which substantial dissociation of the reaction products occurs, and separating the alkyl esters from the reaction mixture by distillation in a current of an olefine gas at a temperature below that at which objectionable dissociation of the reaction products occurs.

6. In a method of making an isopropyl ester of an aliphatic acid, the step which consists in reacting propylene with a substantially anhydrous aliphatic acid in the presence of a catalyst consisting of diethyl sulfate, the reaction mixture being maintained under sufficiently high pressure to maintain the propylene liquid and at a temperature of about 100 to about 150° C.

7. In a method of making an isopropyl ester of an aliphatic acid, the step which consists in reacting propylene with a substantially anhydrous acetic acid in the presence of a catalyst consisting of diethyl sulfate, the reaction mixture being maintained under sufficiently high pressure to maintain the propylene liquid and at a temperature of about 100 to about 150° C.

HAROLD S. DAVIS.
ALFRED W. FRANCIS.